Aug. 24, 1943.   F. R. ZIMMERMAN   2,327,952
METHOD AND MACHINE FOR FORMING BLANKS FOR PAPER RECEPTACLES
Filed Jan. 19, 1939   8 Sheets-Sheet 1
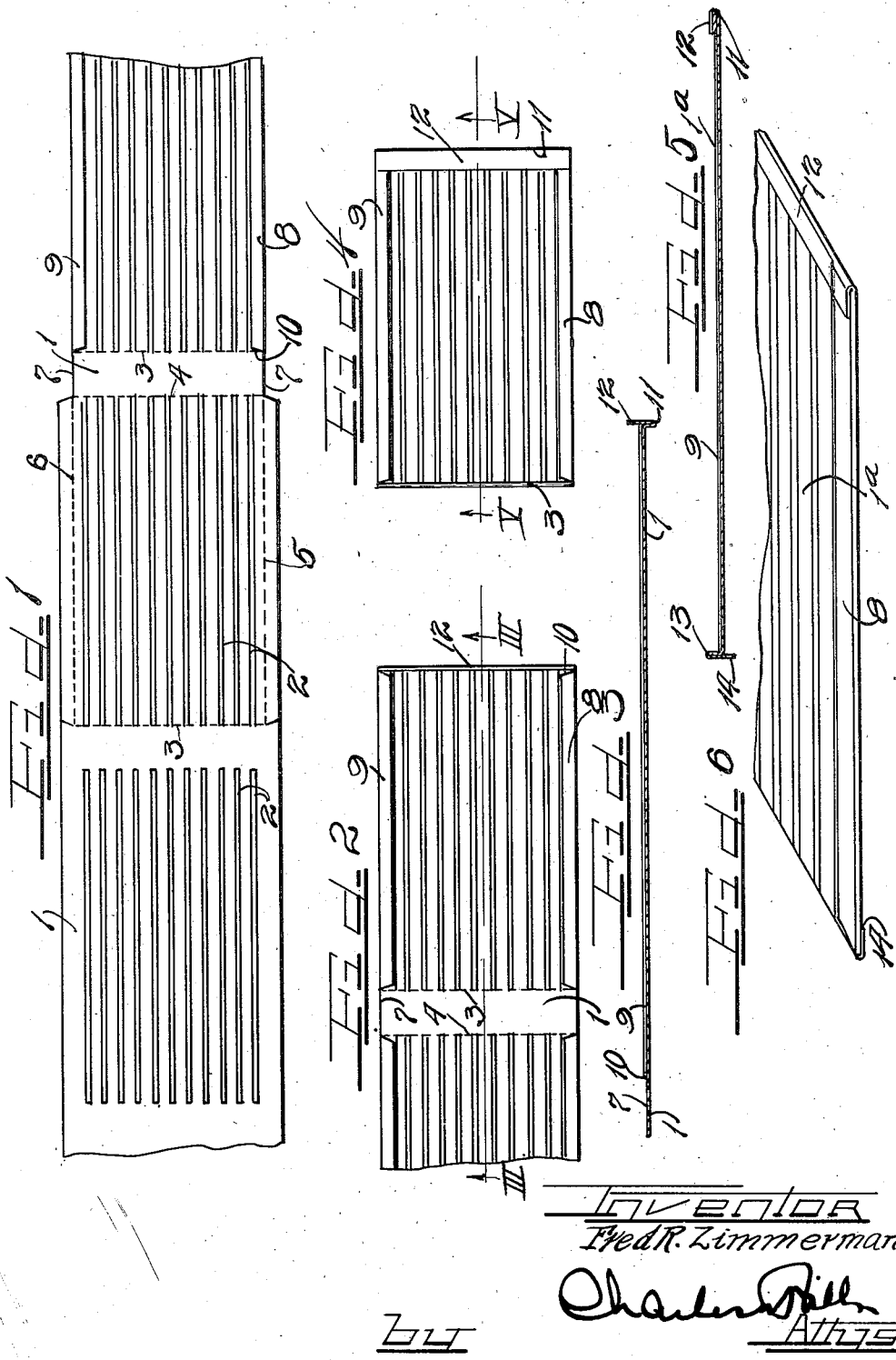

Aug. 24, 1943.    F. R. ZIMMERMAN    2,327,952
METHOD AND MACHINE FOR FORMING BLANKS FOR PAPER RECEPTACLES
Filed Jan. 19, 1939    8 Sheets-Sheet 2
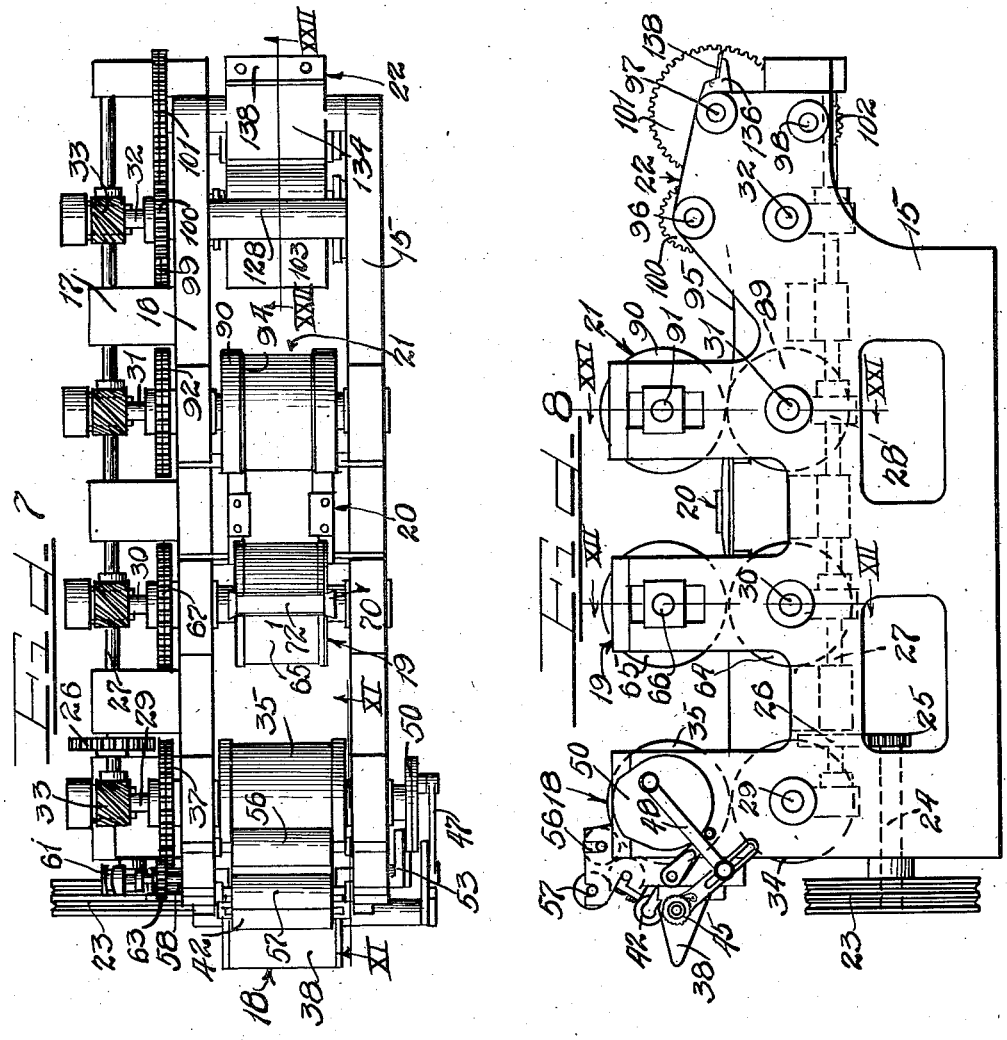
INVENTOR
Fred R. Zimmerman
BY
Charles W. Hill
ATTYS.

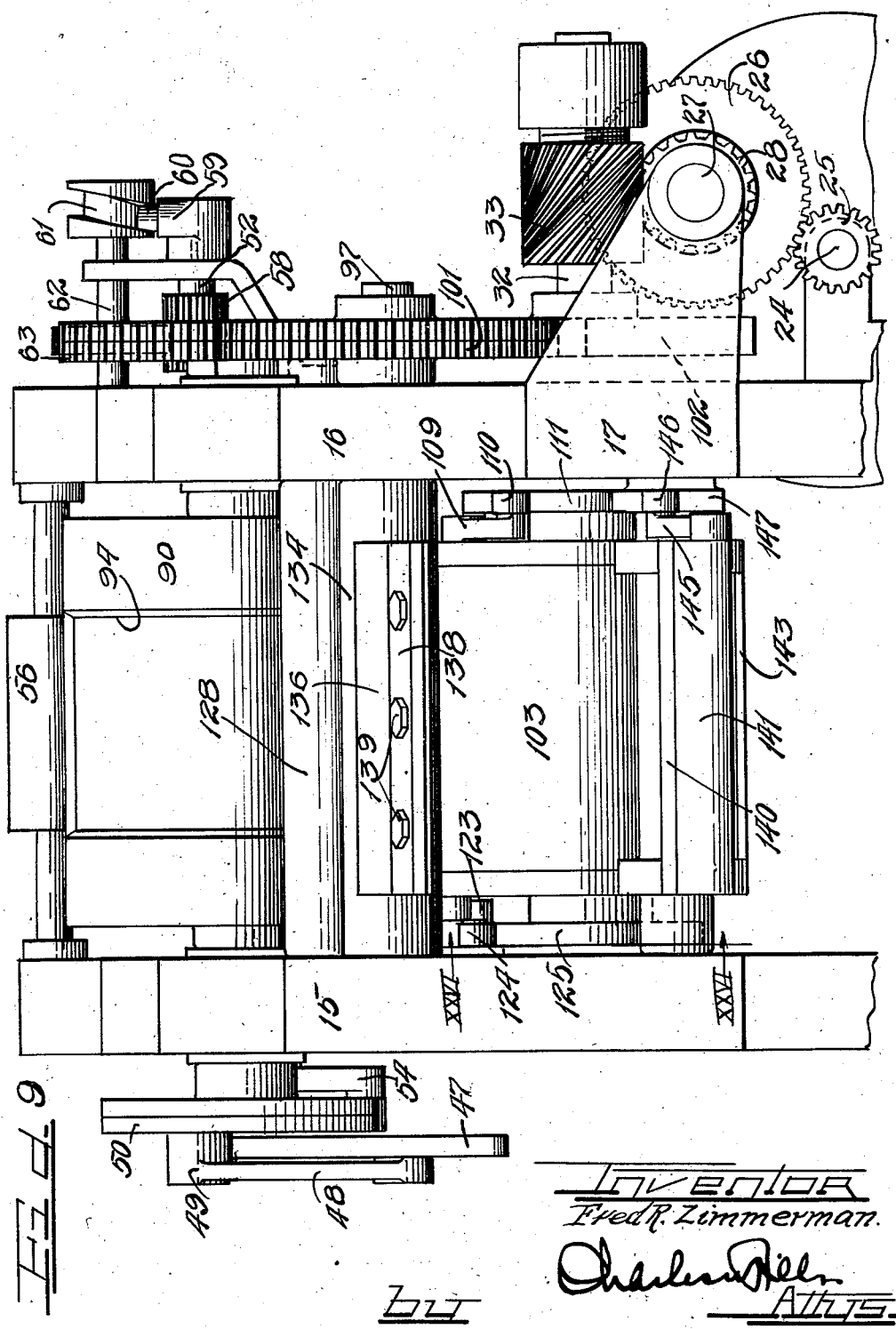

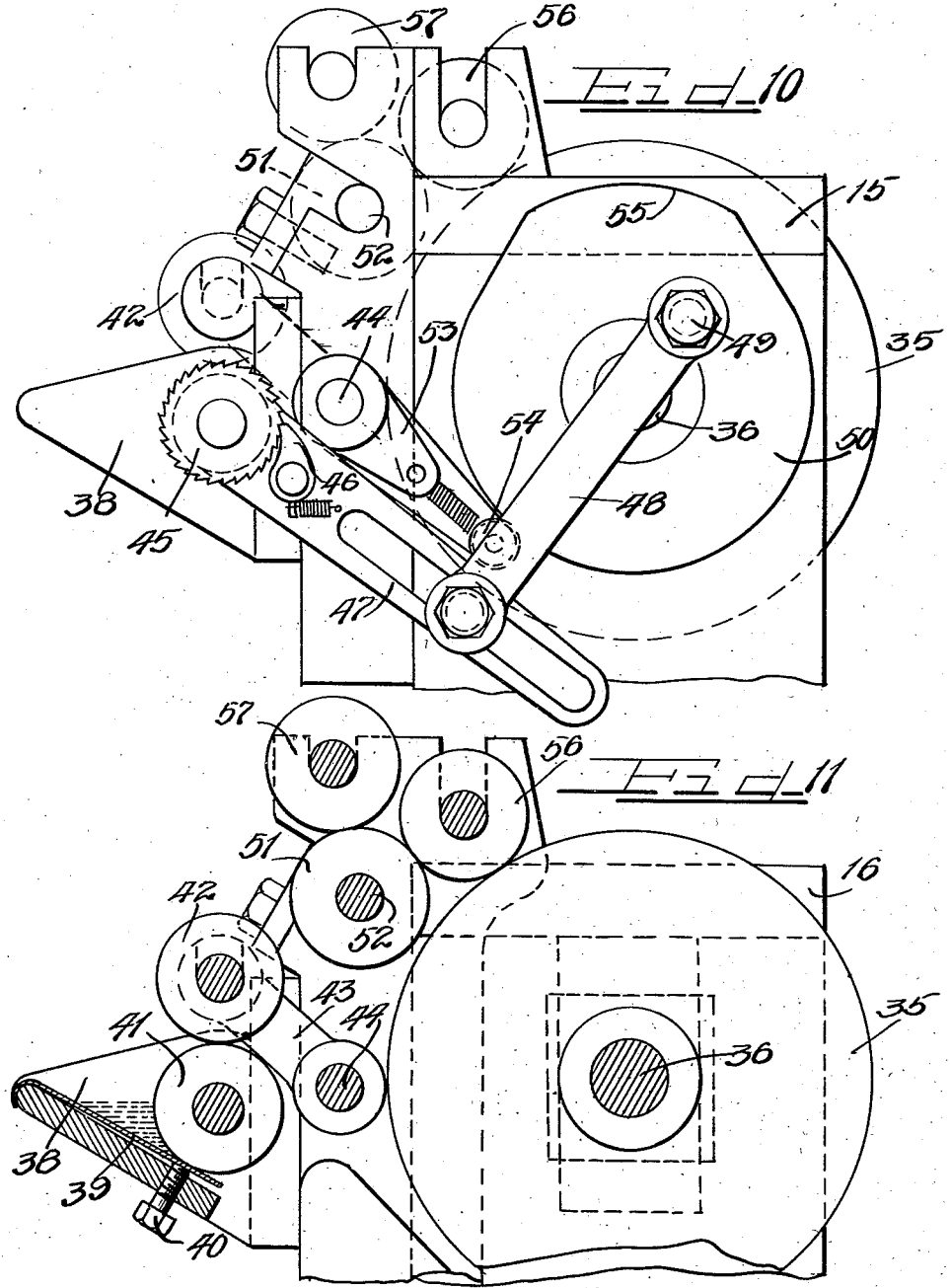

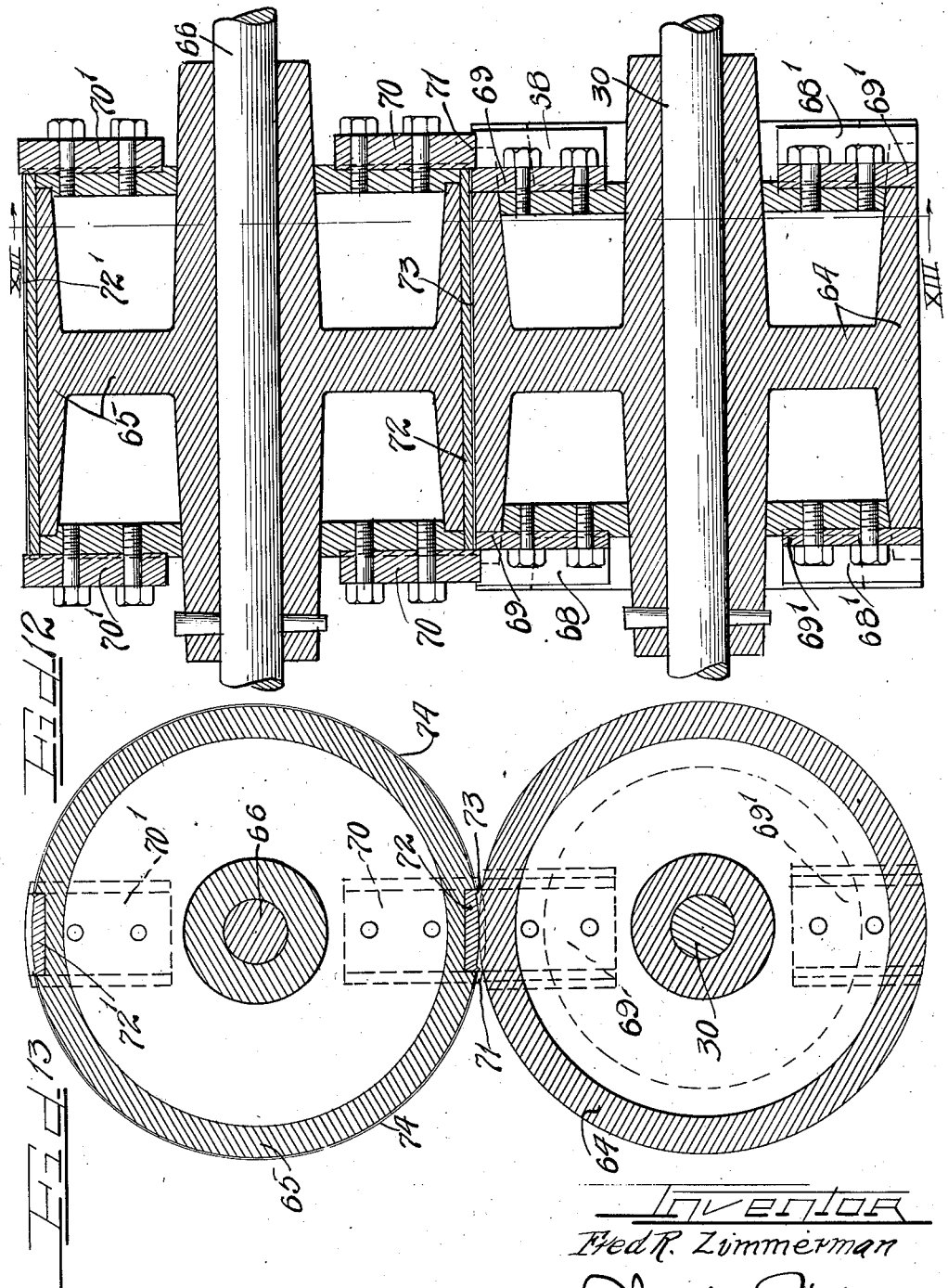

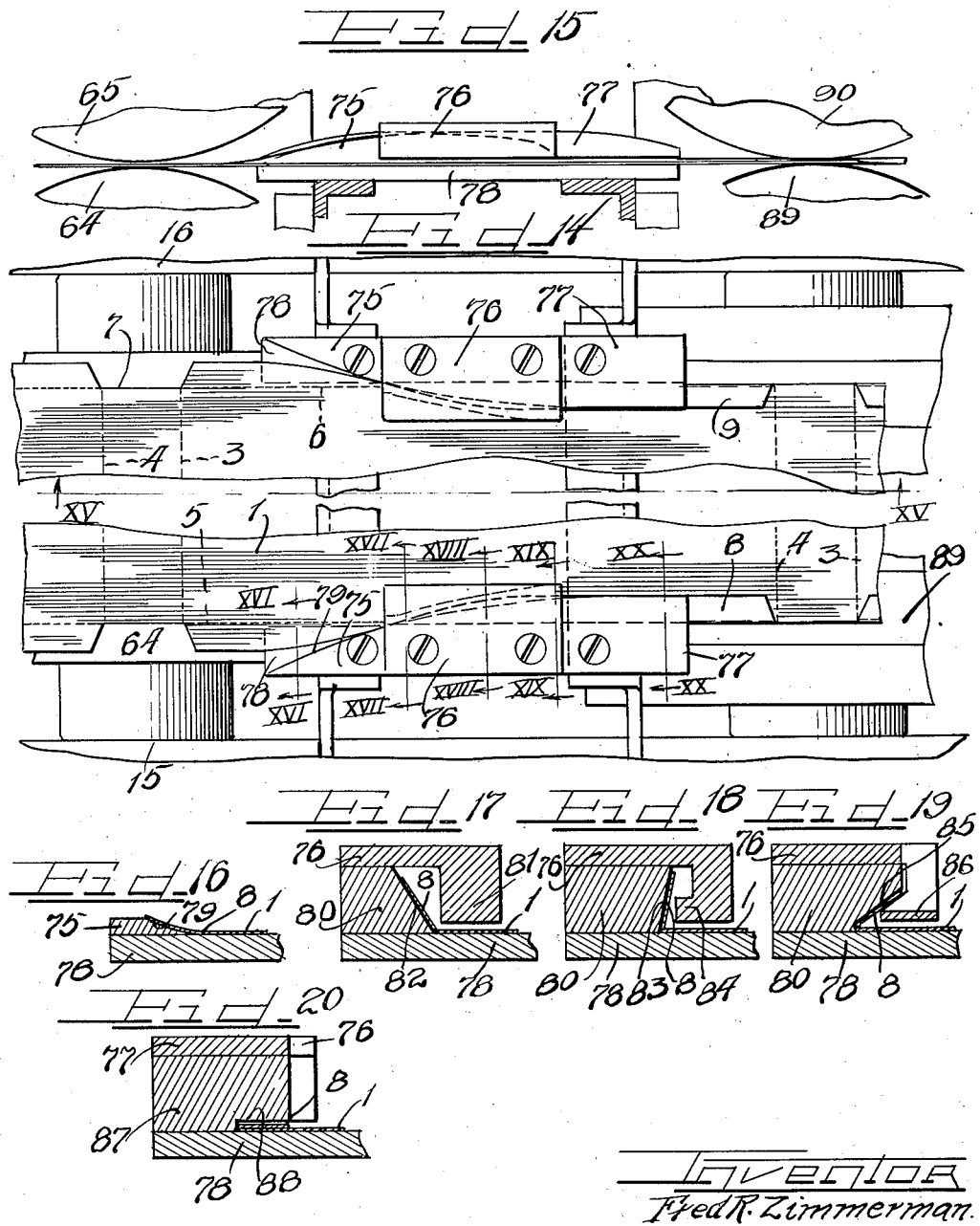

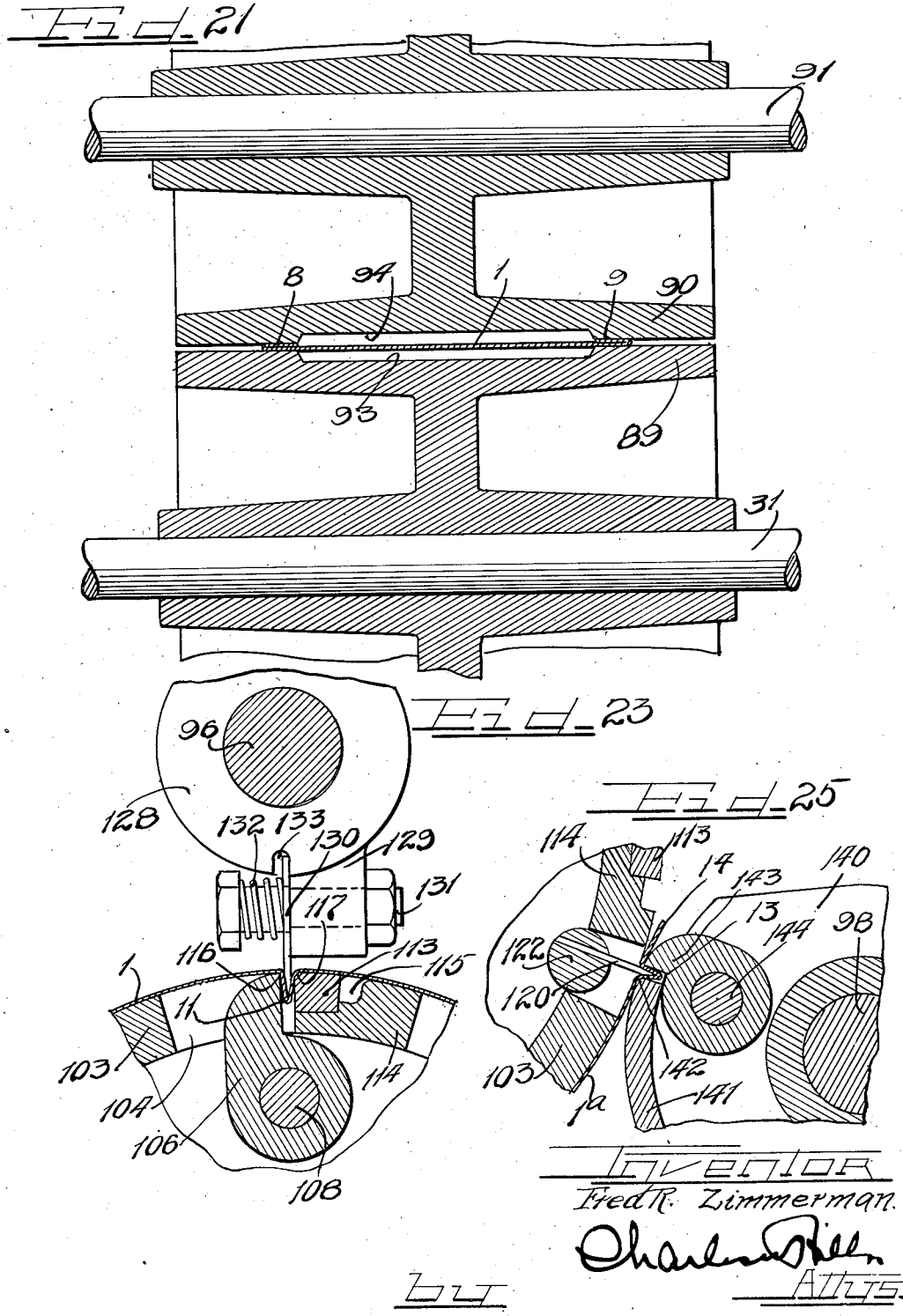

Aug. 24, 1943.  F. R. ZIMMERMAN  2,327,952
METHOD AND MACHINE FOR FORMING BLANKS FOR PAPER RECEPTACLES
Filed Jan. 19, 1939  8 Sheets-Sheet 8
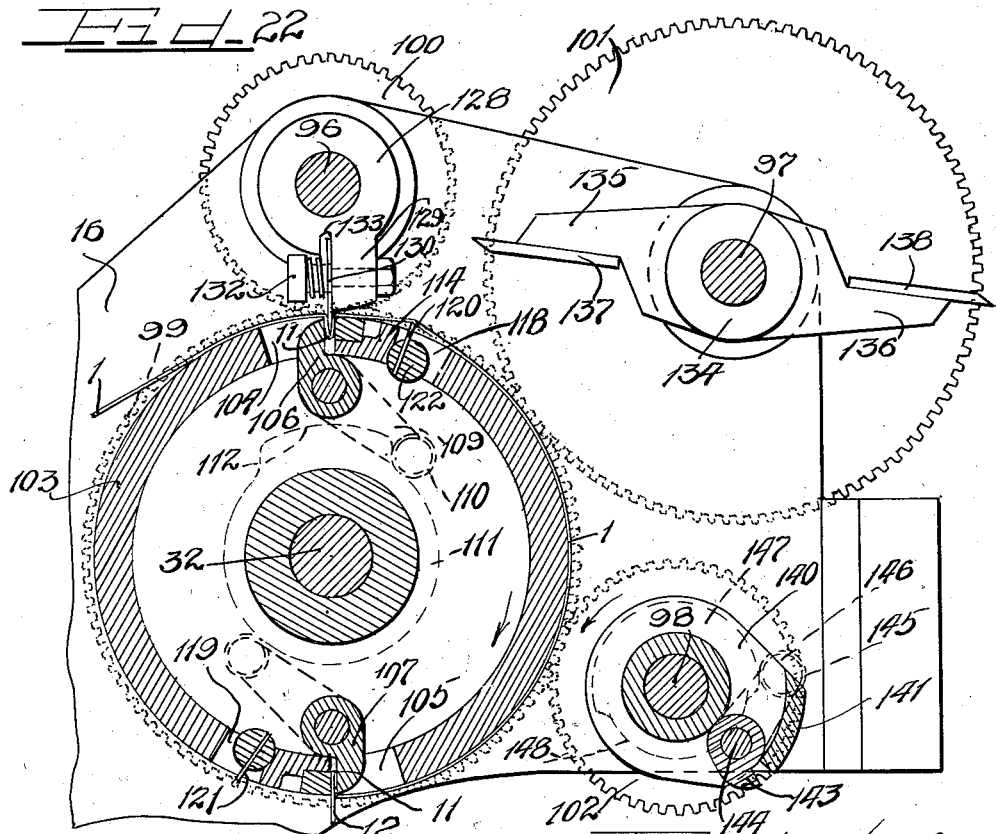
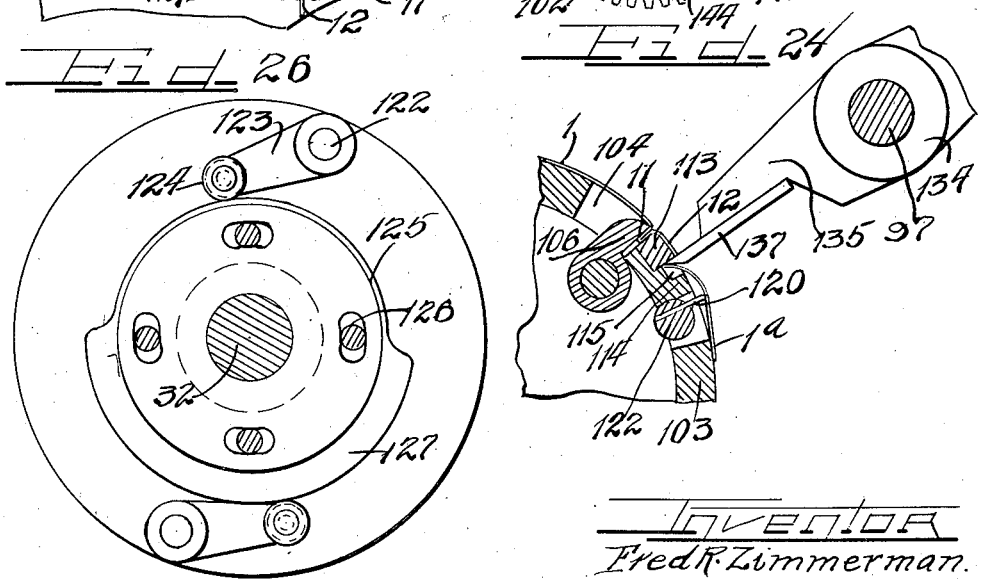
Inventor
Fred R. Zimmerman.
by Charles Hill
Attys.

Patented Aug. 24, 1943

2,327,952

UNITED STATES PATENT OFFICE 2,327,952

METHOD AND MACHINE FOR FORMING BLANKS FOR PAPER RECEPTACLES

Fred R. Zimmerman, Chicago, Ill., assignor, by mesne assignments, to Dixie-Vortex Company, Chicago, Ill., a corporation of Delaware Application January 19, 1939, Serial No. 251,717

38 Claims. (Cl. 93—36)

In the manufacture of container blanks of the character which are used only once in most instances and are subsequently disposed of, economy of production and minimum wastage of stock are highly important factors. Rapidity of manufacture aids materially in reducing cost of production. Proper shaping of the blank to eliminate wastage also reduces the stock cost.

With this in mind, it is an important object of the present invention to provide a machine for shaping blanks to be later formed into containers in an exceedingly rapid and economical manner.

Another object of the invention is the provision of a machine for shaping container blanks, in which substantially all of the moving parts operate continuously.

A further object of the invention is the provision of a machine for shaping container blanks of a type in which several folding operations are necessary, the machine successively severing blanks from a substantially continuous ribbon of stock but making a plurality of the folding operations prior to the cutting of a blank from the stock ribbon.

It is also an object of this invention to provide a machine for making a container blank embodying a plurality of forming operations, in which machine stock is fed in substantially a continuous ribbon, and most of the forming operations upon the blank are completed prior to the severance of the blank from the leading portion of the stock ribbon.

The machine also embodies means for continuously feeding a stock ribbon through the machine, successively and simultaneously acting upon different portions of the stock ribbon to shape portions of different blanks, and completing the major operations upon a blank before that blank is severed from the stock ribbon.

The invention also provides a machine capable of making a container blank having a transverse folded portion, such folded portion being provided in a substantially continuous stock ribbon being fed through the machine, before the blank is cut from the ribbon.

A further object of the invention is the provision of a machine for making container blanks embodying transverse folded portions, in which machine a transverse fold for a leading and a following blank are both formed in a substantially continuous stock ribbon, prior to the severance of the leading blank from the ribbon.

Another feature of the invention is the provision of a machine capable of advancing a substantially continuous stock ribbon, printing a suitable design or legend upon the stock ribbon, cutting portions from the stock ribbon, folding other portions of the stock ribbon, and after completing the major forming operations, severing a now nearly formed blank from the leading part of the stock ribbon.

Still another object of the invention is the provision of a machine for making container blanks, in which a substantially continuous ribbon of stock is fed through the machine, and formations are provided on the ribbon of stock for a plurality of container blanks prior to the severance of a blank from the ribbon.

A further feature of the invention is to provide a new and novel method of making a container blank.

While some of the more salient features, characteristics and advantages of the present invention have been above pointed out, others will become apparent from the following disclosures, taken in conjunction with the accompanying drawings, in which:

Figure 1 is a fragmentary plan view of a stock strip illustrating the initial steps in the making of a container blank embodying principles of this invention.

Figure 2 is a fragmentary plan view illustrating a further step in the making of the blank;

Figure 3 is a fragmentary sectional view taken substantially as indicated by the line III—III of Figure 2, looking in the direction of the arrows;

Figure 4 is a plan view of a blank after it has been severed from the stock ribbon;

Figure 5 is a sectional view taken substantially as indicated by the line V—V of Figure 4;

Figure 6 is a fragmentary projection view of a finished blank;

Figure 7 is a plan view of a machine for making the blank seen in Figure 6, and embodying principles of the present invention;

Figure 8 is a side elevational view of the machine;

Figure 9 is an enlarged fragmentary end elevation of the machine taken from the right of Figures 7 and 8;

Figure 10 is an enlarged fragmentary elevational view illustrating the printing mechanism seen in the upper left-hand portion of Figure 8;

Figure 11 is a fragmentary vertical sectional view through the printing mechanism taken substantially as indicated by the line XI—XI of Figure 7;

Figure 12 is an enlarged fragmentary vertical sectional view through the scoring and cutting rolls, taken substantially as indicated by the line XII—XII of Figure 8, with parts omitted and parts shown in elevation;

Figure 13 is a transverse vertical sectional view taken substantially as indicated by the line XIII—XIII of Figure 12;

Figure 14 is an enlarged fragmentary plan view of the side folding elements, the upper roll at each end of this figure being removed;

Figure 15 is a fragmentary vertical sectional view taken substantially as indicated by the line XV—XV of Figure 14;

Figure 16 is a fragmentary transverse sectional view taken substantially as indicated by the line XVI—XVI of Figure 14;

Figure 17 is an enlarged fragmentary sectional view taken substantially as indicated by the line XVII—XVII of Figure 14;

Figure 18 is an enlarged fragmentary sectional view taken substantially as indicated by the line XVIII—XVIII of Figure 14;

Figure 19 is an enlarged sectional view taken substantially as indicated by the line XIX—XIX of Figure 14;

Figure 20 is an enlarged fragmentary sectional view taken substantially as indicated by the line XX—XX of Figure 14;

Figure 21 is an enlarged fragmentary vertical sectional view through the feeding rolls taken substantially as indicated by the line XXI—XXI of Figure 8, with parts omitted and parts shown in elevation;

Figure 22 is an enlarged fragmentary vertical sectional view through the transverse folding and blank severing means taken substantially as indicated by the line XXII—XXII of Figure 7;

Figure 23 is an enlarged fragmentary showing of the upper left-hand portion of Figure 22;

Figure 24 is an enlarged fragmentary showing of the central portion of Figure 22 after the parts have advanced from the position seen in Figure 22;

Figure 25 is an enlarged fragmentary sectional view of the lower central portion of Figure 22, after the parts have advanced from the position seen in Figure 22; and Figure 26 is an enlarged vertical sectional view taken substantially as indicated by the line XXVI—XXVI of Figure 9, with parts omitted.

As shown on the drawings:

For the purpose of clarity, the present invention both as to machine and method is herein illustrated and described in connection with the manufacture or making of a blank having marginal folds and which may be shaped into substantially cylindrical form for containing a quantity of ice cream or other frozen comestible. Certain of the folded margins form a base for engagement by end caps, and other margins are interlockable to maintain the carton or wrapper in shape. In most instances, the ice cream or other frozen product will be frozen in and to the cylindrical wrapper, and it is a simple expedient at the time of sale to cut straight through the wrapper and its contents in the event a lesser portion of the particular product is desired by the purchaser.

The present invention concerns itself with the manufacture of completely formed blanks in the flat, and these blanks are later folded or bent into container shape at the time they are filled. The blanks may be made of any suitable material, such as reasonably heavy paper or fiber stock in the event ice cream or a similar commodity is to be packaged, and the weight of the stock may be varied as desired, depending upon the intended contents.

The method in general

Figures 1 to 6, inclusive, are indicative of the general method of making a container blank under the principles of this invention. A ribbon of stock 1 is preferably fed continuously along a predetermined path from a suitable source of supply, such as a spool or roll of stock. During its course of travel, the strip is provided with printed matter, generally indicated by numeral 2, which may be of any desired character, either letters or decorative design, and is preferably applied in spaced areas, as seen in Figure 1. After the printing, the stock strip is provided with scorings, the arrangement being such that each blank contains four score lines defining a rectangular area, and including two transverse score lines 3 and 4 and two score lines 5 and 6 parallel to the axis of the strip but adjacent the side margins thereof.

Contemporaneously with the provision of the score lines 3 and 4, notches 7 are cut out from opposite sides of the strip, these notches each having a depth equivalent to the marginal area defined by the score lines 5 and 6, but the notches are spaced between adjacent score lines 5—5 and 6—6. The complete shape of a notch is best seen in Figure 14. The cutting of the notches, together with the score lines 5 and 6, defines side marginal tabs 8 and 9 respectively, each of these tabs having a sloping end edge 10 which aids in the folding of the tabs. After the notches are cut, the side tabs 8 and 9 are immediately folded over on the body of the stock strip, as seen in the right hand portion of Figure 1, the folds occurring on the score lines 5 and 6.

The leading marginal portion of the strip is then provided with a U-fold 11 (Figures 2 and 3), the crease of the fold being exactly at the bottom of the U and coinciding with the leading transverse score line 4, so that when released, the portion of the stock inside the score line 4 will by its own resiliency assume its original flat position, and the end tab 12 thus provided will lie flatly over the body of the stock ribbon, as seen in Figures 4 and 5, this end tab, of course, covering the ends of the side tabs 8 and 9.

After the end tab or flap 12 has been so positioned, another U-shaped fold 13 is formed at the opposite end of the strip, the crease of the fold being at the bottom of the U and coinciding with the transverse score line 3, as seen in Figures 4 and 5. Thus, another end flap 14 is formed, but it will be noted that the U-fold 13 is opposite in direction to the previous fold 11, so that when the fold 13 is released, the stock will by its own resiliency assume its original flat position, but the end flap 14 will be on the opposite side of the stock strip from the end flap 12, as seen clearly in Figure 6.

In use, it is a simple expedient to bend the container blank into substantially cylindrical form, interlock the end flaps 12 and 14, and fill the device with ice cream. When the device is rolled into cylindrical form, the side marginal tabs 8 and 9 will be disposed at opposite ends of the cylinder, where these tabs may provide a stiffened region for the acceptance of suitable caps or covers.

In connection with the machine to be later described herein, the construction is such that a fold 11, to provide an end flap 12, is first made, and then a similar fold is made on the next following score line 4. After these two folds have been made, the stock strip is severed transversely substantially through the center of the blank area between adjacent score lines 3 and 4. The end fold 13 along the score line 3 is then made after the severance of the blank from the stock strip. Such a method of operation of the machine is conducive to more rapid manufacture and consequently a resultant manufacturing economy.

The machine in general

The machine in general will be described in connection more particularly with Figures 7 and 8. The machine includes a suitable pair of oppositely disposed side frames 15 and 16, with the side frame 16 having a plurality of laterally projecting bearing supports 17. These frame members are, of course, supplied with suitable bearings for the various shafts embodied in the machine and are shaped in keeping with the various operating units of the machine, in a manner well understood.

The operating parts of the machine are preferably in continuous motion while the machine is in use. The stock strip travels in a continuous line through the machine. As the stock strip enters the machine proper, it passes through a printing unit, generally indicated by numeral 18. This unit applies the patches of printing 2 mentioned above, which printing may be of substantially any desired character.

After the application of the printed matter, the stock strip next passes through a cutting and scoring unit, generally indicated by numeral 19. This unit provides the score lines 3, 4, 5 and 6 and cuts the stock strip to provide the notches 7—7 on opposite sides thereof, thus defining the side tabs 8 and 9.

Leaving the cutting and scoring unit, the stock strip next passes through a side tab folding unit, generally indicated by numeral 20, which is composed of stationary parts arranged to fold inwardly the side tabs 8 and 9 as the stock strip passes therethrough and thereby.

The next unit encountered by the stock strip is the feed roll unit, generally indicated by numeral 21. While the previously described units act to some extent to advance the stock strip through the machine, most of the movement of the stock strip is accomplished by the feed roll unit 21 which pulls the stock strip through the advance units and delivers the stock strip to the subsequent part of the machine. This feed roll unit not only advances the stock strip, but also compresses the folds of the side marginal tabs 8 and 9 to cause these tabs to lie flatly over the body portion of the stock strip.

Immediately after the feeding roll unit 21, a slack region is permitted to occur in the stock strip, and it then passes into the end tab folding and blank severing unit, generally indicated by numeral 22. This is the final unit of the machine, and the blanks successively leave this unit in finished condition ready for use.

The drive mechanism

The driving mechanism for the machine is best seen in Figures 7, 8 and 9. This mechanism includes a drive pulley 23 carried on the outer end of a short shaft 24, which pulley may be connected to any suitable source of power, such as an electric motor, not shown in the drawings. On the inner end of the shaft 24 is a main drive gear 25 which meshes with a larger gear 26 fixed on an elongated main drive shaft 27 extending substantially the full length of the machine. At periodic intervals therealong, the drive shaft 27 carries a gear 28, all of these gears 28 being similar in nature and each disposed to drive a different operating part of the machine.

Each of the machine units containing moving parts namely the units 18, 19, 21 and 22, also embodies a shaft 29, 30, 31 and 32 respectively. Each of these shafts carries a gear 33, of the worm or a similar type, in mesh with the corresponding gear 28 on the drive shaft 27. As seen best in Figure 8, the shaft 29, 30, 31 or 32, is usually the lowermost shaft of the respective operating unit, and as will more fully appear later herein, a gear on that particular shaft in mesh with a gear on an upper shaft serves to transmit the drive through the particular operating unit.

No further main drive mechanism is necessary for the machine, all of the other moving parts which are driven being connected by suitable gearing to the drive connections above described.

The printing mechanism

The first portion of the machine embodying the printing mechanism is best seen in Figures 10 and 11, with some reference to Figures 7, 8 and 9.

The printing mechanism includes a lower roll 34 carried on the aforesaid shaft 29, and an upper roll 35 carried on the shaft 36 mounted in suitable adjustable bearings in the frame. The shaft 36 is provided with a fixed gear 37 (Figure 7) driven by a similar gear on the shaft 29 directly beneath, so that both the rolls 34 and 35 are driven in opposite directions but in exact synchronism.

The stock sheet travels between the rolls 34 and 35 and receives the patches of printed matter from the roll 35, with the roll 34 acting as a backing member.

Ink is applied to the roll 35 through a suitable chain of inking and distributor rolls to insure an even distribution of ink. Projecting from the frame at one end of the machine is an ink pot 38 equipped with a suitable inking plate 39 near the bottom thereof which may be adjusted by a set screw 40 or the equivalent. An inking roll 41 is periodically rotated against the plate 39 and actuates a free roll 42 merely by surface contact therewith. The free roll 42 is carried on an arm 43 fixed to a pivot shaft 44. The roll 41 is periodically turned a fraction of a revolution by means of a ratchet wheel 45 fixed to the shaft of the roll and engaged by a spring urged pawl 46. The pawl is carried on a slotted arm 47 loosely pivoted on the roll shaft. A link 48 has one end engaged in the slotted arm 47 and the other end is eccentrically pivoted as at 49 to a cam 50 fixed to the shaft 36. It will be seen, therefore, that as the shaft 36 and cam 50 rotate, the slotted arm 47 is periodically pivoted so as to rotate the ratchet wheel 45 and roll 41 by means of the pawl 46.

The ink delivery roll 42 is periodically elevated into contact with a driven roll 51 on a shaft 52. The elevating mechanism includes a crank arm 53 having one end fixed to the shaft 44 and the other end associated with a spring urged cam follower 54 which rides the surface of the aforesaid cam 50. This cam has a high part 55 which depresses the follower 54, turning the shaft 44, and thus elevating the ink delivery roller 42, which roller will rotate by virtue of surface contact against the driven roller 51. An ink delivery roller 56 is in surface contact with both the driven roller 51 and the printing roll 35 to pick up ink from the roller 51 and apply it to the printing mats carried by the roll 35. Also in surface contact with the driven roller 51 is a freely mounted idler roller 57 which smoothes the ink carried by the roller 51 and insures an even application of ink to both the freely mounted applying roller 56 and the printing roll 35.

With reference to Figures 7 and 9, it will be seen that the driven shaft 52 extends beyond the end of the machine and is provided with an elongated gear 58 in mesh with the driving gear 37 for the printing roll 35. This shaft also carries on its end a collar 59 having a projecting follower 60 which rides in a cam groove 61 of a collar carried on the ends of a stubshaft 62. The collar is held against axial movement relatively to the shaft by any suitable means, and the shaft is rotatable relatively to the collar. The collar may be held against rotation with the shaft by any suitable means such as a slide pin projecting from the adjacent frame structure. A gear 63 fixed to the stubshaft 62 is in mesh with the aforesaid gear 37. Therefore, during the rotation of the shafts 52 and 62, the shaft 52 is caused to reciprocate axially by the cam groove 61, the gear 58 being of sufficient width to remain in mesh with the gear 37 during the reciprocating movement. This reciprocating movement of the driven roller 51 further insures an even application of ink.

A brief summary of the operation of the printing unit, therefore, includes the picking up of ink by the intermittently operated roller 41, the application of the ink by surface contact with the pivotal roller 42, the periodic elevation of the roller 42 into surface contact with the driven roller 51 on the reciprocating shaft 52, the application of ink by surface contact to the roller 56 which in turn applies the ink to the printing mats carried by the printing roller 35. The idler roll 57 and the reciprocating action of the roller 51 insures an even application of ink to the printing roll 35.

*The stock strip cutting and scoring mechanism*

The mechanism which provides the score lines 3, 4, 5 and 6 on the stock strip and cuts out portions of the stock strip to provide the notches 7—7, as above explained in connection with Figure 1, is best seen in Figures 7, 8, 12 and 13. This mechanism is also in the form of a pair of large rolls, namely, a roll 64 carried on the aforesaid shaft 30, and an upper roll 65 carried on a shaft 66. The shaft 30 is of course driven from the respective gear 33 and the shaft 66 is equipped with a large gear 67 (Figure 7) in mesh with a similar gear disposed therebeneath on the shaft 30.

By comparative reference to Figure 7, it will be seen that the upper roll 65 is narrower than the printing rolls 34 and 35. This roll 65 is sufficiently narrow to permit the stock strip to project beyond the roll at each side a distance equal to the width of the respective side tab 8 or 9. The rolls 64 and 65 are further designed to operate upon the stock strip so as to mark out a plurality of blanks with each revolution of the roll, in this instance two blanks being marked out upon the stock strip per revolution. By continuous operation, the rolls provide the score lines upon the stock strip and cut out portions to form the notches 7 and define the side tabs 8 and 9, as the stock strip passes between the rolls.

The lower roll 64 is preferably smooth surfaced with the exception of a pair of recesses 68—68 exactly opposite each other in the direction of the axis of the roll. Inside each of these recesses, a knife or shear 69 is firmly attached to the roll. In the illustrated instance, a similar pair of recesses 68'—68' and similar knives or shears 69'—69' are disposed diametrically opposite to the recesses 68.

The upper roll, the narrow one, is provided with a pair of laterally oppositely disposed cutting knives 70—70 which project beyond the circumference of the roll as indicated at 71, and extend within the respective recesses 68—68, cooperating with the knives 69—69 to cut out portions of the stock strip and provide the notches 7—7 in opposite sides of the stock strip. The cut out portions of the stock strip will be disposed within the recesses 68—68 and will fall out by gravity when these recesses reach bottom position. Similar cutting knives 70'—70' are located diametrically opposite to the knives 70—70, for cooperation with the knives 69'—69' on the lower roll 64.

Between the knives 70—70 a scoring plate 72 is set transversely in the face of the roll 65. This scoring plate is provided with a pair of spaced projecting score dies 73 so that the single plate will provide a pair of adjacent score lines 3 and 4 on the stock strip, at the same time the cuts are made to provide the notches 7—7. Diametrically opposite the plate 72, is a similar plate 72' associated with the cutting elements 70'—70'.

With reference to Figure 1, it will be seen that the longitudinal score lines 5 and 6 terminate at the ends of the score lines 3 and 4. To provide these score lines 5 and 6, the roll 65 is provided with a circumferential segmented score die 74 at each end thereof. Each score die 74 extends from the plate 72 to the corresponding plate 72', and the other segment of the score die 74 extends between these same plates on the opposite side of the wheel, the score die terminating at each side of each plate.

From the foregoing, it will be seen that as the stock strip moves continuously between the rolls 64 and 65, the strip is provided with two complete sets of score lines 3, 4, 5 and 6, and provided with two sets of notches 7—7 for each revolution of the rolls.

*The side tab folding mechanism*

The mechanism for folding the aforesaid side tabs 8 and 9 defined by the cutting notches 7—7 over the body of the strip, is best seen Figures 14 to 20 inclusive, with reference for location to Figures 7 and 8.

The mechanism embodies no moving parts but is in the nature of a set of stationary shares on each side of the path of the stock strip. As the stock strip moves continuously thereby, one set of shares folds in the side tab 8 and the other set of shares folds in the side tab 9. The shares in each side of the strip are identical with those upon the other side with the exception that they are opposite in character. This portion of the mechanism is indicated in general by a numeral 20 in Figures 7 and 8.

With reference to Figure 14, it will be seen that each set of shares comprises three adjacent shares 75, 76 and 77, bolted or equivalently secured to suitable portions of the frame structure. A base block 78 extends beneath all of the shares, this block being preferably widened to some extent underneath the central share 76.

With reference more particular to Figure 16, it will be seen that the share 75 is really a flat piece having a curved elevating edge 79. For the purpose of clarity, the set of shares will be herein described in connection with the side tab 8. As the oblique leading edge of the side tab strikes the curved edge of the share 75, it is caused to be elevated, as indicated in Figure 16, for reception by the next share 76.

This share 76 is formed of two separate parts mounted upon the base block 78. The lower part 80 graduates in shape throughout the length of the share, and the upper part, designated 76 for convenience, has an overhanging portion 81 which also graduates in shape throughout the length of the share. Immediately after leaving the share 75, the tab portion 8 of the stock strip rides along the sloping wall 82 on the portion 80 which further elevates the side tab 8. The overhang 81 is merely in the form of a rectangle, tending to keep the side tab 8 from moving away from the sloping wall 82. The sloping wall 82 gradually straightens, as indicated in Figure 18, where the wall is now sloping in the opposite direction, starting to fold the tab 8 over the body portion of the stock strip, as indicated at 83. The overhanging portion of the share is now provided with an inwardly extending projection 84 to maintain the tab 8 in proper position against the wall.

With reference to Figure 19, it will be seen that the share 76 terminates with the sloping wall of the part 80, leaning very much towards the body of the strip 1, as indicated at 85. The overhang has terminated, leaving only a longitudinally extending flat portion 86 as a guide for the tab.

The stock strip and newly folded tab 8 next enter the share 77, there being a gradual change in shape from the form of Figure 19 to the form of Figure 20, all of the shares being disposed adjacent each other so that in effect they operate as a single share. The share 77 is also made up of two separate pieces on the base block 78. The lower piece 87 is provided with a gradually downwardly sloping wall similar to that seen in Figure 19, until near the end of the share 77, the wall has reached a horizontal position, as indicated at 88, when the tab 8 is folded over on top of the body of the stock strip 1.

At the same time, the shares on the opposite side of the stock strip are likewise folding over the tab 9. The folding of both the tabs is very rapid. The stock strip passes continually at reasonably high speed through the shares, and the sloping walls of the shares merely turn the tabs 8 and 9 over upon the body portion of the strip without any cessation of motion of the strip.

*The main feeding mechanism*

The main stock feed, indicated generally by numeral 21 in Figures 7 and 8, is best illustrated in Figure 21.

This feeding mechanism in the main includes merely a pair of rolls, a lower roll 89 carried on the aforesaid driven shaft 31, and an upper roll 90, carried on a shaft 91 which also has affixed thereto a relatively large gear 92 (Figure 7) which meshes with a similar gear on the shaft 31 to transmit the drive to the shaft 91. These feed rolls are of the puller type and not only are designed to provide the main feed of the stock strip 1, but are also designed to firmly compress the now folded side tabs 8 and 9 upon the body portion of the strip 1. As seen clearly in Figure 21, the rolls 89 and 90 are provided with hollows 93 and 94 respectively in the central portions thereof. These hollows are complementary in character and preferably of a width equal to the distance between the inner edges of the folded side tabs 8 and 9. Consequently, the stock strip is firmly gripped between the rolls directly over the side tabs 8 and 9, and these side tabs are firmly pressed upon the body portion of the stock strip as it is advanced by the rolls.

The rolls 89 and 90 are so timed that between them and the end tab folding and blank severing mechanism, generally indicated by numeral 22 in Figure 8, a definite region of slack is permitted to occur in the stock strip. This region of slack is indicated at 95 in Figure 8. Its purpose is to eliminate tautness in the stock strip and to insure ample free stock to permit the folding of the end tabs 12 and 14.

*The end tab folding and blank severing mechanism*

This mechanism is best illustrated in Figures 9 and 22 to 26 inclusive. The mechanism embodies all rotating elements carried on four different shafts, namely, the aforesaid driven shaft 32, the shaft 96 disposed thereabove, a shaft 97, disposed thereabove and to one side, and a shaft 98 disposed slightly therebelow and to one side thereof. The shaft 32 is driven from the main drive shaft through the respective worm gear 33. This shaft 32 also carries a relatively large gear 99 thereon. In mesh with the gear 99 is a smaller gear 100 carried by the shaft 96. Between these two gears there is preferably a 2 to 1 ratio, so that the gear 100 makes two complete revolutions for one revolution of the gear 99. The shaft 97 carries a gear 101 preferably identical with the gear 99 and in mesh therewith, so that the shafts 32 and 97 rotate at the same speed but in opposite directions. Still another gear is in mesh with the gear 99, namely, a smaller gear 102 carried by the shaft 98, and the gear 102 is preferably of the same size as the gear 100, so that the shaft 98 also makes two revolutions to one revolution of the shaft 32.

Carried on the shaft 32 is a folding roll 103 provided with a pair of transversely extending openings 104 and 105 respectively in the tread of the roll, these openings being preferably diametrically opposed. In the opening 104 is disposed the operating portion of a pivoted folding gripper 106, and a similar gripper 107 is disposed in the opening 105. Since each of these folding grippers together with its associated structure functions exactly like the other and is composed of the same parts, it is only necessary herein to specifically describe one of them, for example, the gripper 106, with special reference to Figures 22 and 23.

The gripper 106 is fixed to a shaft 108, and actuated to open and closed positions by means of a crank arm 109 having one end fixed to the shaft 108 and carrying a cam rider in the form of a roller 110 on the opposite end. This rider follows the periphery of a stationary cam 111 (Figures 9 and 22) provided with a hump 112 which elevates the rider, thus moving the gripper 106 into open position. As this gripper is viewed in Figures 22 and 23, it is just assuming closed position, since the rider 110 has just left the cam hump 112, as seen clearly in Figure 22. Opposed to the gripping face of the member 106 is an anvil 113 carried in a cross bar 114 having a groove 115 in its outer surface immediately adjacent the anvil for a purpose that will later appear. On the opposite side of the groove 115, the cross bar 114 forms a portion of the tread of the roll 103. With reference to Figure 23, it should be especially noted that the gripping face of the member 106 is flat and the upper edge of this face is in the nature of a corner 116, which is not sufficiently sharp to score, groove, or cut the stock strip. Opposite to the gripper 106, it will be noted that the anvil has a distinctly rounded edge 117 to avoid making any lasting impressions on the stock strip.

Adjacent the cross member 114, the folding roll 103 is provided with another transversely extending groove 118, and a similar groove 119 is disposed diametrically opposite. These openings 118 and 119 carry tensioning blades 120 and 121 respectively. Since the actuating mechanism and associated structure of the blade 120 is identical with that of the blade 121, it is only necessary to describe one of them herein.

With reference to Figure 22, it will be seen that the tensioning blade 120 is carried by shaft 122, and with reference to Figure 26, it will be seen that this shaft is rotated backward and forward through a partial revolution by a crank arm 123. A cam follower in the nature of a roller 124 is carried on the free end of the crank arm 123 and rides a fixed cam 125 (Figures 9 and 26). This cam floats relatively to the driven shaft 32 and may be mounted in a desired position of adjustment by means of slot and bolt mountings 126. The cam is provided throughout substantially half its circumference with a high part 127 which raises the roller 124 and causes the tensioning blade 120 to be rotated into the slot or opening 118 from its extended position seen in Figure 22 to the position of the tensioning blade 121 seen in this same figure. Conversely, when the cam follower 124 falls off the high part 127 during its course of travel therearound, the tensioning blade 120 is moved to extruded position, as seen in Figure 22. As will more fully later appear, the tensioning blades 120 and 121 perform a double function, namely, to tension the stock strip while the cut which severs a blank is made, and later to press a portion of the stock strip into another folding arrangement to aid in the formation of an end flap fold.

As seen in Figures 22 and 23, the gripper 106 and its anvil 113 are forming the end fold 11, above discussed in connection with Figures 3 and 5. Before the gripper can act upon the stock, it is necessary for the stock to be forked in a double thickness between the gripper and its anvil. This is accomplished by mechanism carried on the shaft 96.

With reference to Figures 22 and 23, it will be seen that this shaft carries a roll 128 in the nature of an elongated collar, from which a supporting bar 129 extends. A blade 130 is carried on this bar by a series of bolts 131 or the equivalent. This blade, however, is apertured so as to freely float on the shanks of the bolts 131 and is urged into flat surface to surface contact with the bar 129 by suitable sets of compression springs 132. The inner margin of the blade is disposed in a groove 133 in the roller collar 128.

It will be noted that the outer margin and edge of the blade 130 project well beyond the supporting bar 129 and during the rotation of the shaft 32 and 96, the outer edge of the blade strikes the stock strip while the gripper 106 is in open position and forces a fold of the stock strip between the gripper and its anvil. It will be recalled that a slack region 95 is permitted to form in the stock strip just in front of the folding roll 103 and thus the stock strip is not placed under undue tension when the blade 130 forms the fold indicated at 11 in Figure 23. Immediately after the entrance of the blade between the gripper and its anvil, the gripper is moved to closed position, as seen in Figures 22 and 23. Since the folding roll 103 and the folding blade 130 are rotating away from each other in opposite directions after the fold is made, the blade may be readily withdrawn from the fold 11, owing to the freedom of movement of the blade within the groove 133 against the action of the spring 132. As soon as the blade is withdrawn, the gripper 106 tightly presses the fold against the anvil 113, as seen best in Figure 24, forming a positive crease in the stock strip at the bottom of the fold, which crease will be along one of the score lines 4.

Shortly after the forming of the fold 11, a blank 1a is severed from the stock strip, the line of cut in this instance being straight across the stock strip. The blank cutter is carried on the shaft 97 and includes a collar 134 carrying diametrically opposed knife supports 135 and 136 to which cutting knives 137 and 138 respectively are affixed by any suitable means such as the bolts 139, as seen in Figure 9. Each cutting knife projects outwardly sufficiently far to enter the aforesaid groove 115 in the respective cross bar 114 carried by the folding roll 103. With reference to Figure 24, it will be seen that the knife acts as a shear in cooperation with the leading sharp edge of the anvil 113 to sever the blank 1a from the stock strip. The width of the groove 115 leaves ample room for the knife to leave the folding roll 103 in its relative rotative movement. It will be noted that the anvil 113 is of a width in keeping with the desired with of the resultant end tab or flap 12 which is left projecting beyond the fold 11 after the severance of the blank 1a. This end tab will, by its own resiliency, assume a radial position with respect to the folding roll 103, as seen at the bottom of Figure 22.

After the severance of the blank, the free portion of the blank falls down until it is picked up and again pressed into contact with the tread of the folding roll 103 by another folding mechanism which provides the fold 13 along the score line 3, thus forming the opposite end tab or flap 14 on the resultant blank. Since the flap 14 lays over the opposite side of the blank from the flap 12, this other folding mechanism is external to the folding roll 103, and is carried by the aforesaid shaft 98.

This shaft 98 carries a mutilated roller 140 thereon, which roller has an outstanding tread portion 141 comprising only a fragmentary portion of the circumference of the circle. This tread portion is cut off straight at the trailing edge thereof and provided with a definitely rounded corner 142 at the top, this edge with the rounded corner functioning as an anvil for a folding gripper 143 carried on a stubshaft 144. This folding gripper is of substantially the same nature and functions in substantially the same manner as the gripper 106 previously described herein. The oscillation of the gripper 143 is controlled by a crank arm 145 affixed to the shaft 144, and carrying on its other end a cam rider in the nature of a roller 146 riding the periphery of a stationary cam 147 (Figures 9 and 22). This cam is provided with a notch 148 which causes a closing movement of the gripper when the roller falls within the notch. When the rider is out of the notch, the gripper is in the open position seen in Figure 22, and when the rider falls within the notch, the gripper tends to close, as seen in Figure 25, where the gripper 143 is shown in nearly closed position.

As the shafts 32 and 98 rotate towards each other, the open gripper 143 will coincide with the projecting tensioning blade 120 and the coincidental arrival of these elements will occur near the trailing ends of the severed blank 1a, so that the blade 120 will force a fold 13 of the blank between the gripper and the anvil end of the tread 141. Upon the withdrawal of the blade 120, the gripper will tightly clamp the fold of the blank and definitely crease the blank along a score line 3 of the blank. That portion of the end tab or flap 14 extending rearwardly beyond the fold will, by its own resiliency, assume a position radial with respect to the shaft 98, and after the release of the gripper, the entire flap 14 will overlie the upper face of the now inserted blank.

Substantially simultaneously with the positive closing of the gripper 143, the gripper 107 (which by this time is approximately one-quarter turn beyond the position seen in Figure 22) opens and releases the blank. The blank is then moved a short distance in the reverse direction by the hold of the gripper 143 to insure complete freedom of the blank. This gripper 143 opens when it is in substantially downward position and the finished blank is permited to drop in inverted position beneath the folding roll 103 and the roll 140 on top of a stack of previously finished blanks, and the blanks may then be packaged for shipment to the user.

Of course, all the actuating crank arms for the grippers 105, 107 and 143 may be spring urged towards the respective cams in a well known manner.

At this point, a short resume of the operation of the mechanism shown in Figures 22 to 26 inclusive may best be given. It will be understood that when the gripper 107 carried by the folding roll 103 was in the upper position, the fold 11 which this gripper is now holding was made. As the gripper then advanced in the direction of the arrow, a blank was severed in front of the gripper, and the gripper then continued to advance to the lowermost position seen in Figure 22. As illustrated in this figure, the upper fold 11 is just being completed by the folding blade 130 and the gripper 106. Both of these folds are made along score lines 4 in the continuous stock strip. As the upper fold 11 by the gripper 106 is completed, the tensioning blade 120 tensions that portion of the stock strip just in advance of the gripper 106 so that it may be neatly severed by the cutting blade 137 when the respective parts reach the relative position seen in Figure 24.

The gripper 107 continues to advance and continues to retain its tight hold upon the fold 11 in the forward portion of the now severed blank 1a. The trailing part of the blank 1a falls away from the folding roll 130 for a very short interval, because it is almost immediately pressed against the folding roll by the tread portion 141 of the roll 140 which has now arrived in operative position. The fact that the rear portion of the severed blank is free provides sufficient slack for the tensioning blade 120 to form another fold 13 along the score line 3 adjacent the opposite end of the blank. This fold of course occurs between the gripper 143 in the anvil end of the tread 141. The fold is tightly compressed for a sufficient interval while the rider 146 is in the notch 148 of the cam 147. In the interim, the gripper 107 holding the leading portion of the blank has advanced substantially one-quarter revolution from the position seen in Figure 22 and has released the other end of the blank. The gripper 143 carries the blank a short distance in the reverse direction and releases the now finished blank, permitting it to fall in inverted position upon a stack of previously formed blanks.

Just prior to the surface contact between the tread of the folding roll 103 and the tread portion 141 of the roll 140 the tensioning blade 121 in advance of the gripper 107 has been rotated into the uneffective position within the slot 19 seen in Figure 22. This rotation is of course effected by the corresponding cam rider 124 climbing the hump 127 of the cam 125. Shortly after the releasing of the blank, this rider falls off the hump 127 and the tensioning blade 121 is moved into operative position prior to the forming of the next fold 11 between the gripper 107 and its anvil.

The gripper 107 is now substantially in the position of the gripper 106 in Figure 22, ready to make another fold 11, while the gripper 106 is still holding tightly to its fold and is in substantially the position of the gripper 107 in Figure 22. The above described process is then repeated, the next blank being severed by the cutting knife 38, two blanks being severed for each revolution of the shaft 97. Likewise, two blanks are formed for each revolution of the shaft 32 while the shafts 96 and 98 each make a single revolution per blank.

The operation

Hereinabove, the operation of the constituent parts of the machine have each been explained to a sufficient extent as to warrant only a brief summary of the operation of the machine as a whole at this point. Likewise, my novel method will also be apparent from the previous discussion thereof, taken in conjunction with the following summary.

Substantially all moving parts of the machine, except certain of the rolls in the printing mechanism, operate continuously and there is a continuous advancing of the stock strip by the puller feed rolls 89 and 90. These rolls pull the strip of stock from a suitable source, such as a roll of stock of the proper width, through the printing mechanism, which, as above explained, provides the spaced patches of printing upon the stock strip. Next the strip is pulled through the scoring rollers 64 and 65 which not only provide the score lines 3 and 4 for the end tabs 12 and 14 but also the score lines 5 and 6 for the side tabs 8 and 9. At the same time, these rolls also sever portions from the margins of the stock strip to provide the notches 7 and 8 and thus clearly define the side tabs 8 and 9. In addition, the roll 64 picks up the waste stock removed when the notches 7—7 are provided and disposes of this waste in a manner so that the waste will never interfere with the operation of other parts of the machine.

Immediately upon leaving the rolls 64 and 65, the stock strip enters the stationary forming shares which turn the side tabs 8 and 9 over upon the body portion of the stock strip. After leaving the feeding rolls, the flat portion 95 is permitted to form in the stock strip and the strip enters the folding and blank severing mechanism above described in connection with Figures 22 to 26 inclusive.

In this mechanism, a fold 11 is first provided in the stock strip along a score line 4. Next, another fold 11 is provided in the stock strip along the following score line 4. A blank is then severed from the stock strip between these folds, and finally a fold 13 is provided adjacent the trailing end of the now severed blank along one of the score lines 3, and the finished blank is permitted to fall below the folding member 103 and roll 140.

From the foregoing, it is apparent that I have provided a novel method of and apparatus for making a container blank, both the method and machine herein set forth aiding materially in the very rapid and economical production of blanks. It will also be noted that the machine is relatively simple in construction, may operate continuously at relatively high speed, and embodies very durable operating parts capable of sustained operation for a long period of time without becoming out of order.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of making a paper container blank, including the steps of making a pair of spaced transverse folds in a stock strip, one said fold being near an end of said strip, severing said strip between said folds to remove a blank therefrom, and forming a similar but opposite fold near the other end of the severed blank.

2. The method of making a paper container blank, including the steps of forming a plurality of spaced folds in a substantially continuous stock strip, severing said strip between adjacent folds to remove a blank therefrom, and then forming a similar fold in the severed blank.

3. The method of making a paper container blank, including the steps of forming a plurality of spaced folds in and entirely across a substantially continuous stock strip, severing said strip between adjacent folds to remove a blank therefrom, and then forming a similar fold but in the opposite direction to the first fold in the severed blank, while maintaining both the stock strip and ultimately the severed blank in continuous motion along a predetermined path.

4. The method of making paper container blanks, including the steps of advancing a substantially continuous stock strip along a predetermined path, scoring a quadrilateral pattern on said strip for each blank, cutting portions from said strip between said patterns to define side tabs for each blank, folding said side tabs, forming transverse folds in said strip along score lines of a pair of blanks, then severing said strip between the transverse folds, and providing a similar transverse fold in the severed blank.

5. The method of making paper container blanks, including the steps of advancing a substantially continuous stock strip along a predetermined path, scoring a quadrilateral pattern on said strip for each blank, cutting portions from said strip between said patterns to define side tabs for each blank, folding said side tabs, forming transverse folds in said strip along score lines of a pair of blanks, then severing said strip between the transverse folds, and providing a similar transverse fold in the severed blank while maintaining both the stock strip and ultimately each severed blank until it is finished in continuous motion along said path.

6. The method of forming paper container blanks, including the steps of continuously advancing a stock ribbon along a predetermined path, printing said ribbon in spaced patches, scoring said ribbon laterally and longitudinally, folding said ribbon along the longitudinal score lines, folding said ribbon transversely along the lateral score lines, severing a blank by cutting the ribbon between transverse folds, and providing another similar transverse fold in the severed blank.

7. The method of making container blanks, including the steps of advancing a stock ribbon along a predetermined path, scoring said ribbon at intervals longitudinally in a pair of spaced locations, cutting notches in said ribbon between the score lines to define side tabs laterally outward of the score lines, folding said tabs inwardly over the body of the ribbon, and severing a blank by cutting the ribbon transversely between longitudinally spaced tabs.

8. The method of making container blanks, including the steps of advancing a stock ribbon along a predetermined path, scoring said ribbon longitudinally along the side margins thereof, notching the margins at intervals to define side tabs, folding said tabs over the body of the ribbon, folding said ribbon transversely a plurality of times with each fold between adjacent tabs, and severing said ribbon between transverse folds to remove a blank therefrom.

9. The method of making container blanks, including the steps of advancing a stock ribbon along a predetermined path, scoring said ribbon longitudinally along the side margins thereof, notching the margins at intervals to define side tabs, folding said tabs over the body of the ribbon, folding said ribbon transversely a plurality of times with each fold between adjacent tabs, and severing said ribbon transversely between adjacent side tabs and between adjacent transverse folds to remove a blank therefrom, and forming another similar transverse fold in the severed blank, all while maintaining said stock ribbon and ultimately the severed blank until finished in continuous motion along said path.

10. In a machine for making container blanks, feeding means for advancing a stock ribbon through the machine, printing means arranged to apply spaced patches of printing on said ribbon, scoring means arranged to score a pattern on said ribbon, folding means to fold portions of the ribbon over upon the body thereof on certain parts of the scored pattern, other folding means to provide transverse folds in said ribbon, cutting means arranged to sever a blank by cutting the ribbon between transverse folds, and additional folding means to provide another similar transverse fold in the severed blank.

11. In a machine for making container blanks, feeding means for advancing a stock ribbon through the machine, folding means arranged to provide a plurality of spaced transverse folds in said ribbon, cutting means arranged to sever a blank by cutting said ribbon between adjacent transverse folds, and additional folding means to provide another transverse fold in the severed blank.

12. In a machine for making container blanks, feeding means for advancing a stock ribbon through the machine, folding means arranged to provide a plurality of spaced transverse folds in said ribbon, cutting means arranged to sever a blank by cutting said ribbon between adjacent transverse folds, and additional folding means to provide another transverse fold in the severed blank, all said means operating continuously and maintaining said ribbon and each severed blank until finished in continuous movement along its path of travel.

13. In a machine for making container blanks, feeding means for advancing a stock ribbon through the machine, folding means disposed to engage said ribbon adjacent the leading edge thereof and fold it transversely to define an end flap on the resultant blank, means to provide a similar fold in said ribbon for the following container blank, cutting means to sever said ribbon between said folds and remove a blank from the ribbon, and folding means to provide another transverse fold adjacent the trailing edge of the severed blank to define another end flap.

14. In a machine for making container blanks, feeding means for advancing a stock ribbon through the machine, folding means disposed to engage said ribbon adjacent the leading edge thereof and fold it transversely to define an end flap on the resultant blank, means to provide a similar fold in said ribbon for the following container blank, cutting means to sever said ribbon between said folds and remove a blank from the ribbon, and folding means disposed oppositely to the first said folding means arranged to engage the severed blank near the trailing edge thereof and provide another transverse fold to define an end flap disposed oppositely to the first end flap.

15. In a machine for making one-piece container blanks, feeding means to advance a stock ribbon through the machine, folding means arranged to fold the leading margin of the stock ribbon transversely to provide an end flap for the resultant blank, cutting means to sever a blank from said ribbon after the operation of said folding means, and other folding means to provide a transverse fold in the trailing margin of the severed blank.

16. In a machine for making container blanks, feeding means arranged to continuously advance a stock ribbon, shaping means acting on said ribbon during the course of its travel to partially form successive blanks, cutting means to sever a partially formed blank from said ribbon, means for maintaining the severed blank in continuous motion along its path, and other shaping means to finish the travelling severed blank.

17. In a machine of the character described, feeding means to advance a stock ribbon along a predetermined path, scoring means arranged to provide a longitudinal score line at intervals along the side margins of said ribbon, means for notching said margins at intervals to a depth of the score lines but between longitudinally spaced score lines to define side tabs, and folding means to fold said side tabs over the body of the ribbon along said score lines, and cutting means arranged to sever blanks from said ribbon after the action of said folding means.

18. In a machine of the character described, feeding means to advance a stock ribbon along a predetermined path, cutting means arranged to provide notches at spaced intervals in opposed marginal portions of said ribbon to define marginal tabs, blank severing means arranged to cut said ribbon along a line passing through opposed notches leaving a portion extending at each end of the severed blank beyond the folded flaps, and folding means arranged to fold said end portions over the body of the blank.

19. In a machine of character described, feeding means to advance a stock ribbon along a predetermined path, cutting means arranged to provide notches at spaced intervals in opposed marginal portions of said ribbon to define marginal tabs, folding means to fold said tabs over the body of the ribbon, blank severing means arranged to cut said ribbon through opposed notches having end portions extending beyond the folded marginal tabs, and folding means arranged to fold said end portions over the body of the blank in opposite directions along lines adjacent the ends of said marginal tabs.

20. In a machine of the character described, feeding means to advance a stock ribbon along a predetermined path, cutting means arranged to provide notches at spaced intervals in opposed marginal portions of said ribbon to define marginal tabs, and stationary shares positioned at each side of the path of said ribbon and shaped to fold said tabs over the body of the ribbon as it passes by the shares.

21. In a machine of the character described, feeding means to advance a stock ribbon along a predetermined path, and notching means in the nature of a pair of superposed rolls between which said ribbon passes, the upper roll being narrower than said ribbon, cutting dies projecting on the ends of said upper roll extending below the roll, the lower roll being wider than the upper roll and provided with recesses for receiving the projecting part of said dies and also the waste stock removed thereby from the stock ribbon.

22. In a machine of the character described, means for advancing a stock ribbon through the machine, and a combination notching and scoring element positioned to act on the travelling ribbon, said element being in the nature of a roll having a transverse insert carrying spaced transverse scoring dies, cutting members at the ends of the roll between the dies to notch the margins of the ribbon, and circumferentially extending scoring dies terminating at the transverse scoring dies.

23. In a machine of the character described, feeding means to advance a stock ribbon through the machine, and a folding roll carrying gripping means to grasp the leading margin of the ribbon and make a transverse fold therein, similar gripping means also carried by said roll spaced from the first gripping means to provide a similar fold in said ribbon, and blank severing means arranged to cut said ribbon between said folds.

24. In a machine of the character described, feeding means to advance a stock ribbon through the machine, a folding roll carrying gripping means to grasp the leading margin of the ribbon and make a transverse fold therein, similar gripping means also carried by said roll spaced from the first gripping means to provide a similar fold in said ribbon, and means cooperating with said roll to successively press the portions of the ribbon into said gripping means.

25. In a machine of the character described, feeding means to advance a stock ribbon through the machine, a folding roll carrying gripping means to grasp the leading margin of the ribbon and make a transverse fold therein, similar gripping means also carried by said roll spaced from the first gripping means to provide a similar fold in said ribbon, blank severing means arranged to cut said ribbon between said folds, and an external gripping member arranged to pick up the trailing part of the severed blank and provide a similar transverse fold at the trailing end of the blank.

26. In a machine of the character described, feeding means to advance a stock ribbon through the machine, a folding roll carrying gripping means to grasp the leading margin of the ribbon and make a transverse fold therein, blank tensioning means carried by said roll arranged to press the ribbon away from the surface of the roll to tension the same, cutting means operating on the tensioned part of the ribbon to sever a blank therefrom, other gripping means to make a similar transverse fold in the trailing margin of the severed blank, and said tensioning means also acting to press said trailing margin into said other gripping means.

27. The method of making a paper container blank, including the steps of making a pair of spaced transverse folds in a stock strip, each of which folds is a complete reverse bend extending entirely across the strip adjacent a substantially imperforate part of the strip, then successively severing blanks from the strip by cutting the strip completely thereacross through said imperforate part between said folds, and providing another similar fold in each blank so severed.

28. The method of making a paper container blank, including the steps of feeding a substantially continuous strip of stock along a predetermined path in a direction defined by the longitudinal axis of the strip, making a pair of spaced complete reverse folds in said strip transversely thereacross, and then severing the strip along a single line of cut completely across the strip between said folds to remove a blank from the strip.

29. The method of making a paper container blank, including the steps of successively forming complete reverse folds in a substantially continuous stock strip transversely and across the complete width of the strip in such timed order that there are at least two such folds in the strip prior to cutting, and then successively cutting the strip transversely thereof between adjacent folds to successively sever blanks one after the other from said strip.

30. The method of making a paper container blank, including the steps of successively forming spaced transverse folds in a substantially continuous and uncut stock strip, and successively severing said strip between adjacent folds and in an unfolded portion thereof to remove blanks one after the other therefrom, while maintaining said strip in continuous motion along a predetermined path.

31. The method of successively making paper container blanks, including the steps of successively forming spaced transverse finished reverse folds in a substantially continuous and uncut single-piece stock strip, such folds extending entirely across the strip, successively severing the strip between adjacent folds to remove blanks therefrom, each such severing operation occurring after there are a plurality of folds in the strip, and continuing the process until the strip has thus been reduced to blanks.

32. The method of successively making paper container blanks, including the steps of successively forming spaced transverse finished folds in a substantially continuous and imperforate stock strip, successively severing the strip between adjacent folds to remove blanks therefrom, each severing operation occurring after there are a plurality of folds in the strip, providing another similar fold in each severed blank after severance, and continuing the process until the strip has been reduced to blanks and the other fold provided in each blank.

33. In a machine for making container blanks, feeding means for advancing a substantially continuous single piece ribbon of stock along a path defined by the longitudinal axis of the ribbon, folding means arranged to provide a plurality of spaced complete reverse folds in the ribbon transversely thereacross, and cutting means arranged to sever a blank by cutting said ribbon along a single line of cut completely across said ribbon between adjacent folds.

34. In a machine for making container blanks, feeding means for advancing a substantially continuous and uncut stock ribbon through the machine in a direction defined by the longitudinal axis of the ribbon, folding means arranged to provide a plurality of spaced complete reverse folds transversely across said ribbon, and cutting means timed to sever a blank by cutting said strip completely thereacross in an uncut region between adjacent folds, all said means operating continuously and maintaining a continuous movement of the stock strip through the machine.

35. In a machine for making container blanks, feeding means for advancing a substantially continuous and uncut stock strip through the machine in a direction defined by the longitudinal axis of the strip, folding means arranged to successively provide complete reverse folds transversely across the complete width of said ribbon, and cutting means timed to successively sever blanks from said ribbon by cutting the ribbon thereacross between adjacent folds, each operation of said cutting means occurring after there are a plurality of such folds in the substantially continuous ribbon.

36. In a machine for making container blanks, feeding means for advancing a substantially continuous and uncut stock strip through the machine in a direction defined by the longitudinal axis of the strip, folding means arranged to successively provide complete reverse folds transversely across said ribbon, cutting means timed to successively sever blanks from said ribbon by cutting the ribbon thereacross between adjacent folds, each operation of said cutting means occurring after there are a plurality of such folds in the substantially continuous ribbon, and additional folding means arranged to provide another similar fold in each severed blank.

37. In a machine for making container blanks, feeding means to advance a stock ribbon longitudinally through the machine, folding means arranged to fold the leading margin of the stock ribbon transversely in a complete reverse fold to provide an end flap for the resultant blank, cutting means timed to sever a blank from said ribbon after the operation of said folding means, and other folding means arranged to provide a similar reverse fold in the trailing margin of the severed blank.

38. The method of making a container blank, including the steps of advancing a stock ribbon longitudinally along a predetermined path, folding the leading margin of the stock ribbon transversely in a complete reverse fold, severing said ribbon thereacross after said folding step in a location such that said fold is at the leading end of the blank, and then forming a similar reverse fold in the trailing margin of the severed blank.

FRED R. ZIMMERMAN.